(12) United States Patent
Haensel et al.

(10) Patent No.: US 10,720,750 B2
(45) Date of Patent: Jul. 21, 2020

(54) METHOD FOR OPERATING A LASER DEVICE, RESONATOR ARRANGEMENT AND USE OF A PHASE SHIFTER

(71) Applicant: MENLO SYSTEMS GMBH, Martinsried (DE)

(72) Inventors: Wolfgang Haensel, Munich (DE); Tilo Steinmetz, Munich (DE); Marc Fischer, Munich (DE); Matthias Lezius, Unterschleissheim (DE); Ronald Holzwarth, Groebenzell (DE)

(73) Assignee: MENLO SYSTEMS GMBH, Martinsried (DE)

( * ) Notice: Subject to any disclaimer, the term of this patent is extended or adjusted under 35 U.S.C. 154(b) by 169 days.

(21) Appl. No.: 15/126,874

(22) PCT Filed: Mar. 16, 2015

(86) PCT No.: PCT/EP2015/000578
§ 371 (c)(1),
(2) Date: Sep. 16, 2016

(87) PCT Pub. No.: WO2015/139829
PCT Pub. Date: Sep. 24, 2015

(65) Prior Publication Data
US 2017/0093117 A1    Mar. 30, 2017

(30) Foreign Application Priority Data

Mar. 17, 2014    (DE) .................. 10 2014 204 941

(51) Int. Cl.
*H01S 3/13*    (2006.01)
*H01S 3/08*    (2006.01)
(Continued)

(52) U.S. Cl.
CPC .......... *H01S 3/1307* (2013.01); *H01S 3/0057* (2013.01); *H01S 3/083* (2013.01);
(Continued)

(58) Field of Classification Search
CPC .... H01S 3/1307; H01S 3/1636; H01S 3/0057; H01S 3/08054; H01S 3/1625;
(Continued)

(56) References Cited

U.S. PATENT DOCUMENTS

| 6,018,602 A | 1/2000 | Mayor et al. |
| 6,697,161 B2 | 2/2004 | Klein |

(Continued)

FOREIGN PATENT DOCUMENTS

| CN | 103424194 A | 12/2013 |
| DE | 199 11 103 A1 | 9/2000 |

(Continued)

OTHER PUBLICATIONS

Notification of Transmittal of Translation of the International Preliminary Report issued in Application No. PCT/EP2015/000578 dated Sep. 29, 2016 (1 page).

(Continued)

*Primary Examiner* — M. A. Golub-Miller
(74) *Attorney, Agent, or Firm* — Flynn Thiel, P.C.

(57) ABSTRACT

A method for operating a laser device, including providing a laser pulse in a resonator so that the laser pulse circulates in the resonator, the laser pulse having a carrier wave; determining an offset frequency ($f_0$) of the frequency comb corresponding to the laser pulse, the frequency comb having a plurality of laser modes ($f_m$) at a distance ($f_{rep}$) from one another, the frequencies of which can be described by the formula: $f_m = m \cdot f_{rep} + f_0$, m being a natural number, and varying the offset frequency ($f_0$) by varying a geometric (Continued)

Figure 4:
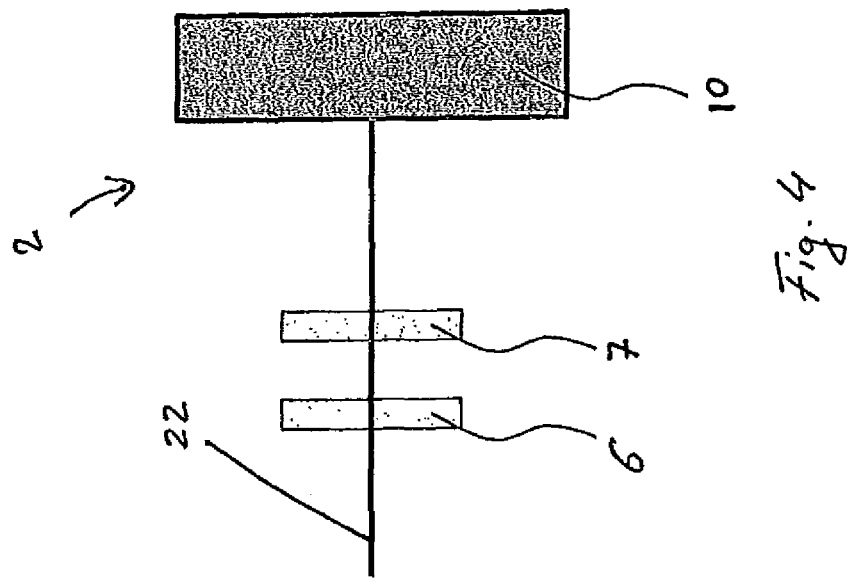

phase (Δφ) that is imparted to the carrier wave of the laser pulse per resonator circulation.

25 Claims, 13 Drawing Sheets

(51) Int. Cl.

| | | |
|---|---|---|
| *H01S 3/083* | (2006.01) | |
| *H01S 3/10* | (2006.01) | |
| *H01S 3/106* | (2006.01) | |
| *H01S 3/107* | (2006.01) | |
| *H01S 3/16* | (2006.01) | |
| *H01S 3/00* | (2006.01) | |
| *H01S 3/139* | (2006.01) | |
| *H01S 3/081* | (2006.01) | |
| *H01S 3/11* | (2006.01) | |
| *H01S 3/067* | (2006.01) | |

(52) U.S. Cl.
CPC ......... *H01S 3/08054* (2013.01); *H01S 3/107* (2013.01); *H01S 3/10061* (2013.01); *H01S 3/1065* (2013.01); *H01S 3/1625* (2013.01); *H01S 3/1636* (2013.01); *H01S 3/06791* (2013.01); *H01S 3/0811* (2013.01); *H01S 3/0816* (2013.01); *H01S 3/1067* (2013.01); *H01S 3/1112* (2013.01); *H01S 3/139* (2013.01)

(58) Field of Classification Search
CPC ...... H01S 3/083; H01S 3/107; H01S 3/10061; H01S 3/1065; H01S 3/06791; H01S 3/1112; H01S 3/0816; H01S 3/0811; H01S 3/139; H01S 3/1067
See application file for complete search history.

(56) References Cited

U.S. PATENT DOCUMENTS

| | | | |
|---|---|---|---|
| 6,785,303 | B1 | 8/2004 | Holzwarth et al. |
| 7,040,760 | B2 | 5/2006 | Nakanishi et al. |
| 7,418,017 | B2 | 8/2008 | Holzwarth et al. |
| 7,936,508 | B2 | 5/2011 | Oto |
| 2004/0017833 | A1 | 1/2004 | Cundiff et al. |
| 2004/0213302 | A1 | 10/2004 | Fermann et al. |
| 2007/0071060 | A1 | 3/2007 | Holzwarth et al. |

FOREIGN PATENT DOCUMENTS

| | | |
|---|---|---|
| DE | 100 44 404 A1 | 4/2002 |
| DE | 10 2005 035 173 A1 | 2/2007 |
| EP | 1 161 782 B1 | 12/2001 |
| EP | 1 372 275 A1 | 12/2003 |
| EP | 2 178 180 A1 | 4/2010 |
| JP | 2-294617 | 12/1990 |
| JP | 11-26852 A | 1/1999 |
| JP | 2002-318169 A | 10/2002 |
| JP | 2004-294941 A | 10/2004 |
| JP | 2005-241406 A | 9/2005 |
| JP | 2006-179779 A | 7/2006 |
| JP | 2006-267201 A | 10/2006 |
| JP | 2007-256365 A | 10/2007 |
| JP | 2007-316158 A | 12/2007 |
| JP | 2008-310340 A | 12/2008 |
| JP | 2011-76097 A | 4/2011 |
| JP | 2012-132711 A | 7/2012 |
| JP | 2014-41273 A | 3/2014 |
| WO | WO 2009/066755 A1 | 5/2009 |

OTHER PUBLICATIONS

International Preliminary Report on Patentability issued in Application No. PCT/EP2015/000578 dated Sep. 20, 2016 (1 page).
English translation of Written Opinion of the International Searching Authority issued in Application No. PCT/EP2015/000578 dated Jul. 7, 2015 (5 pages).
Office Action of Japanese Patent Office with English translation issued in Japanese Application No. 2016-558018 dated Sep. 29, 2017 (12 pages).
Office Action of Chinese Patent Office issued in Chinese Application No. 201580024994.3 with English translation dated Jul. 12, 2018 (10 pages).
International Search Report issued in Application No. PCT/EP2015/000578 with English translation, dated Jul. 7, 2015 (7 pages).
Written Opinion of International Searching Authority issued in Application No. PCT/EP2015/000578 dated Jul. 7, 2015 (6 pages).
Chyba et al. article, Measurement of the Pancharatnam phase for a light beam, Optics Letters, vol. 13, No. 7, Jul. 1988 pp. 562-564.
Hudson et al. article, Mode-locked fiber laser frequency-controlled with an intracavity electro-optic modulator, Optics Letters, vol. 30, No. 21, Nov. 1, 2005 pp. 2948-2950.
Saleh, et al. article, Fundamental of Photonics, second edition, 2007, John Wiley & Sons, Inc. pp. 201-203.
Shen et al. article, Electronic control of nonlinear-polarization-rotation mode locking in Yb-doped fiber lasers, Optics Letters, vol. 37, No. 16, Aug. 15, 2012 pp. 3426-3428.

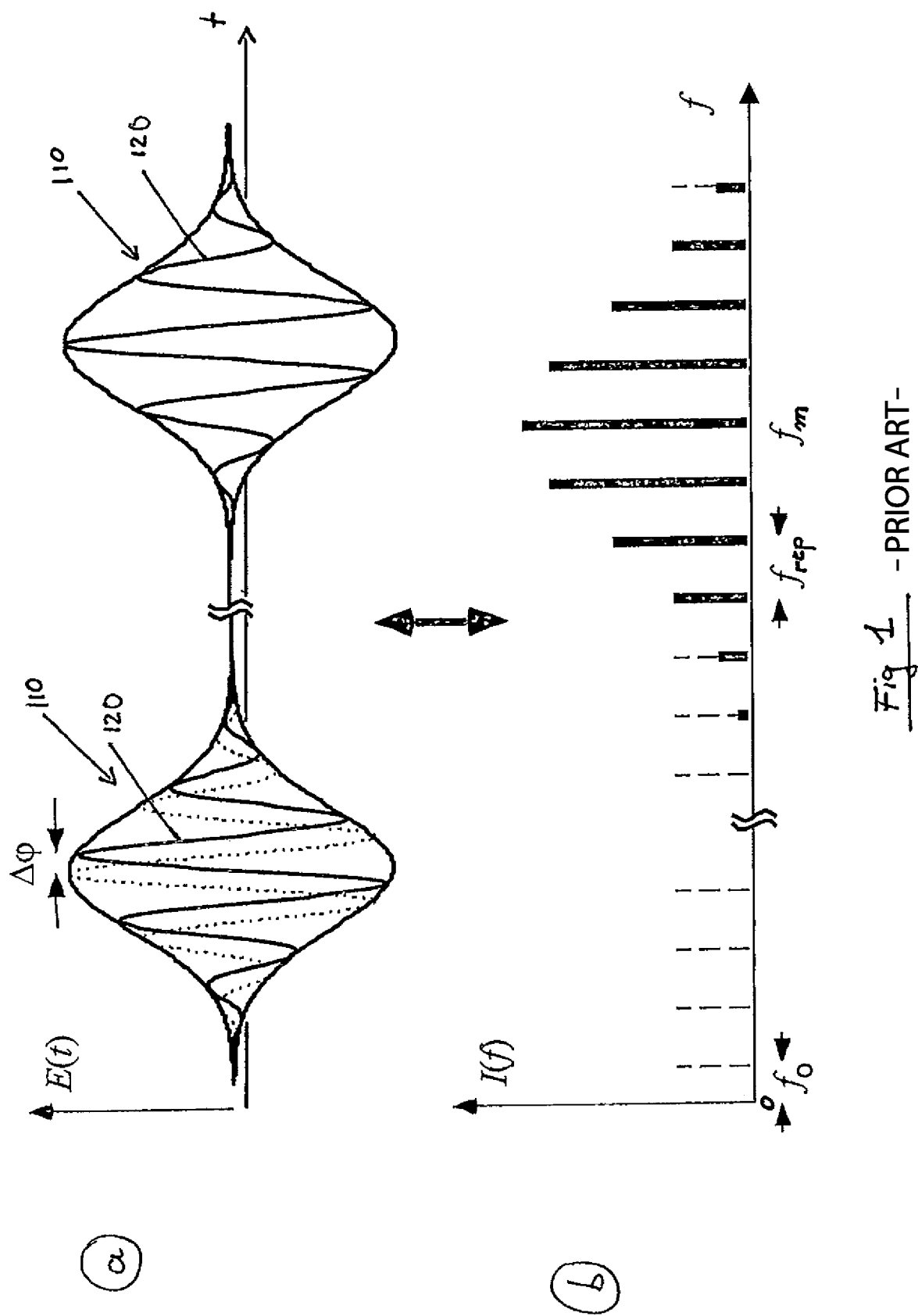
Fig 1 -PRIOR ART-

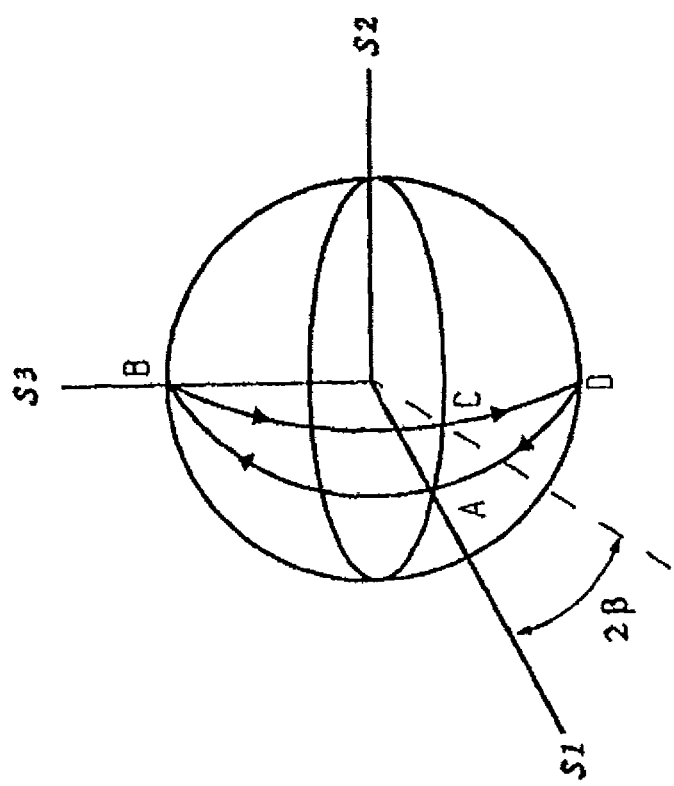
Fig. 2 -PRIOR ART-

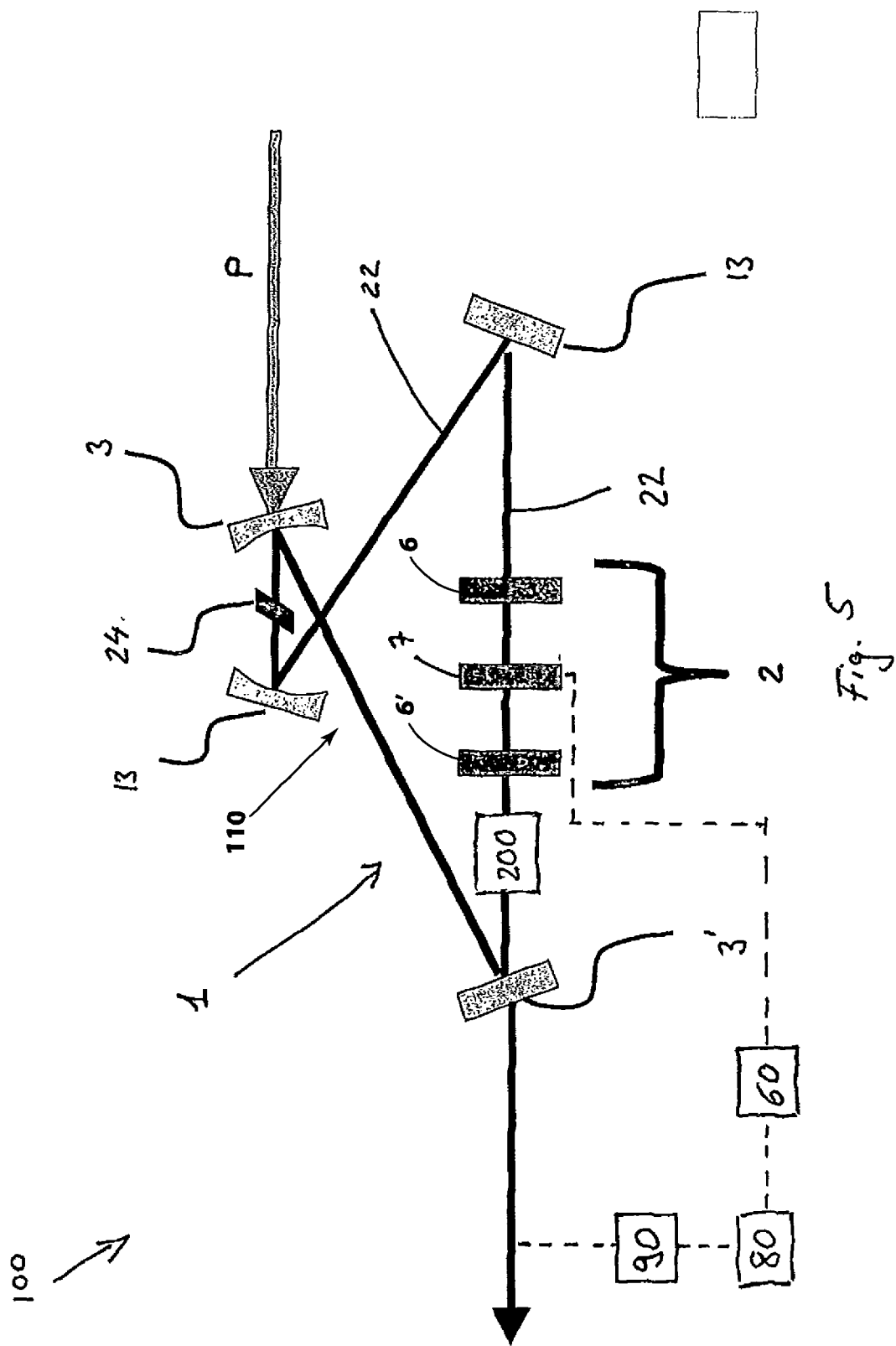

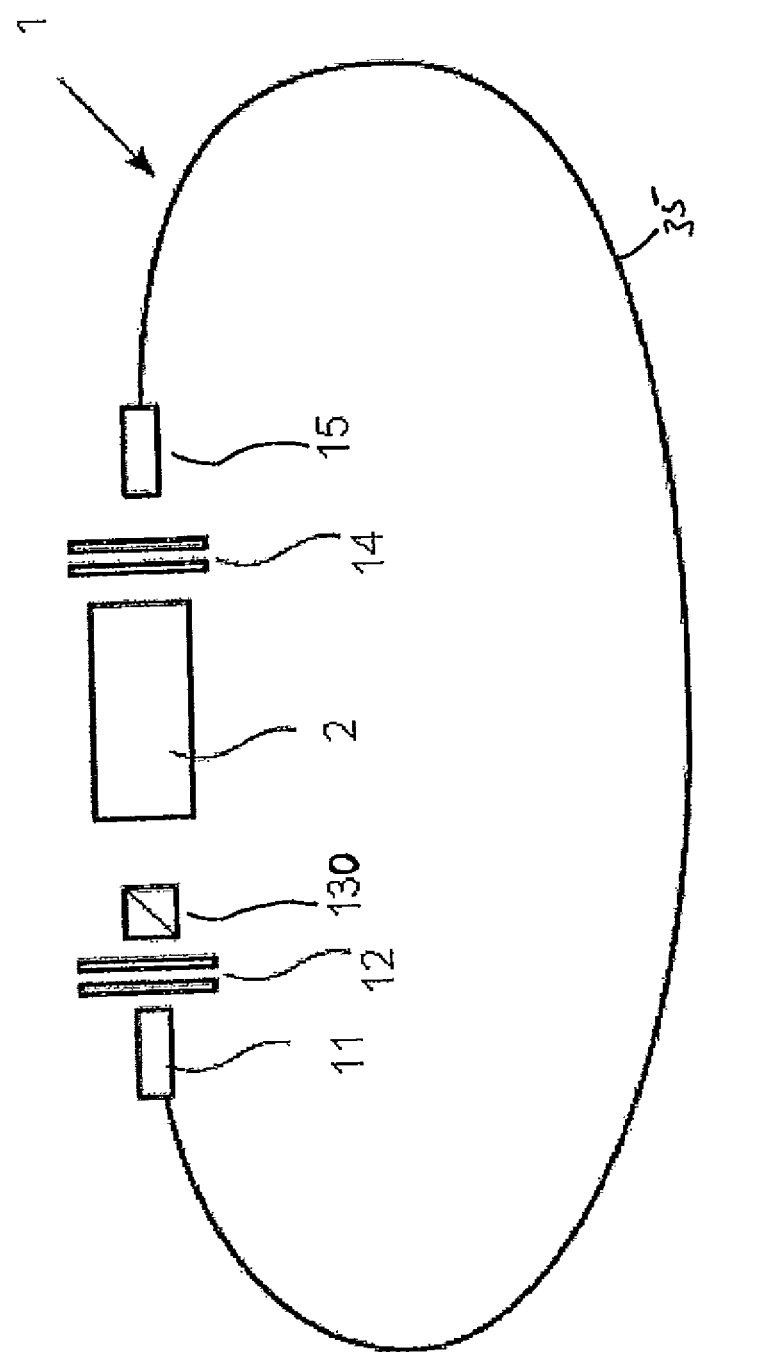

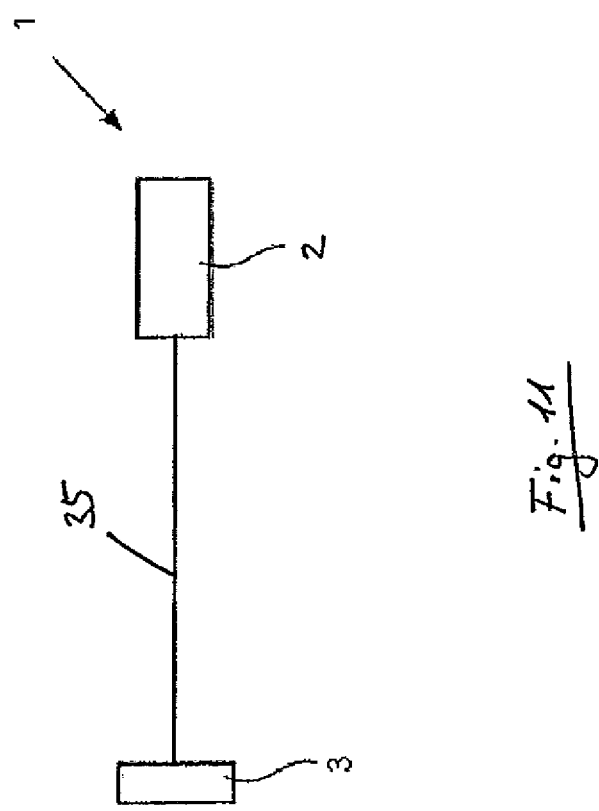

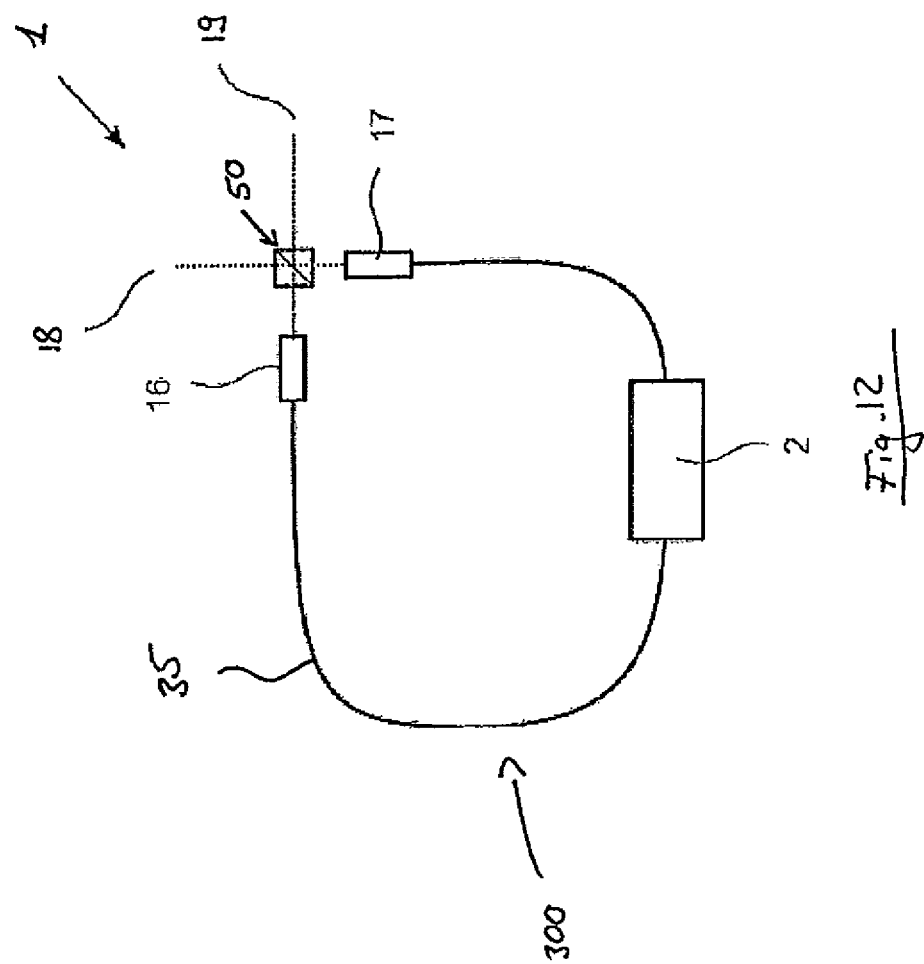

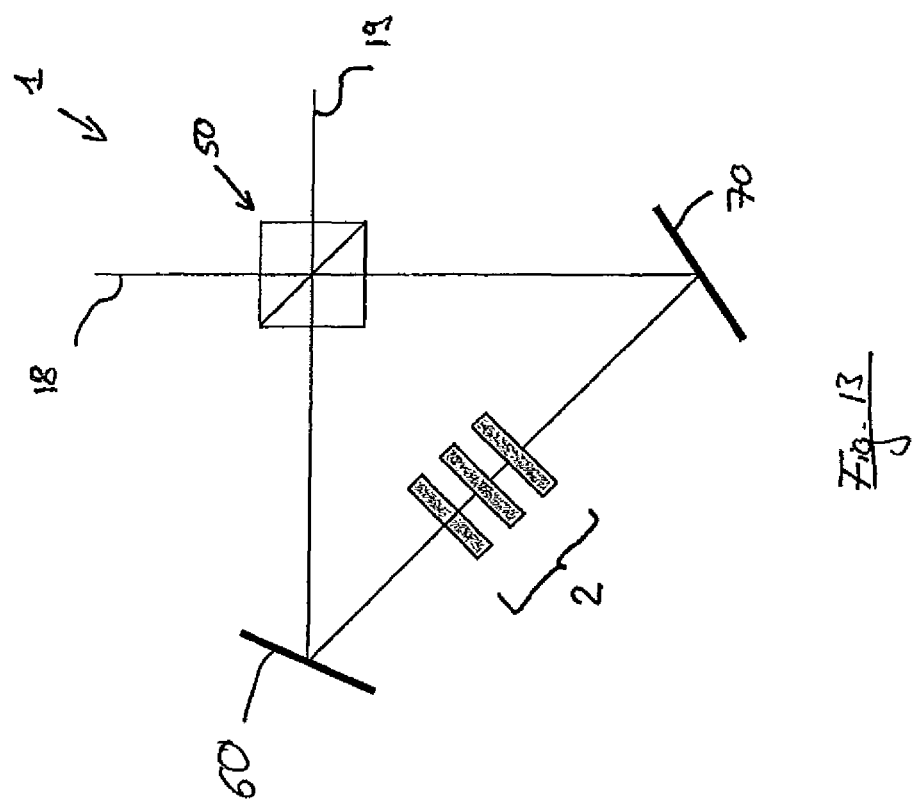

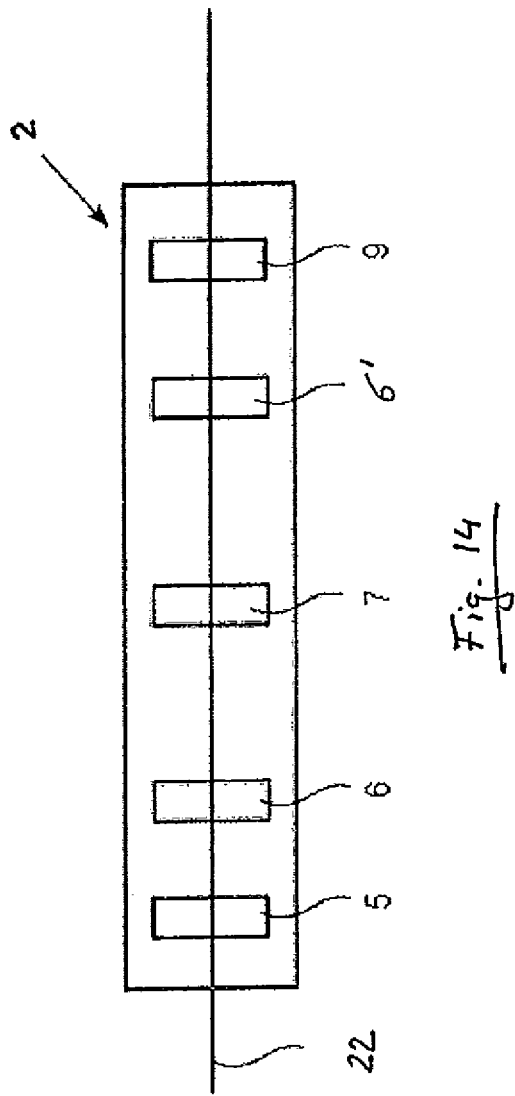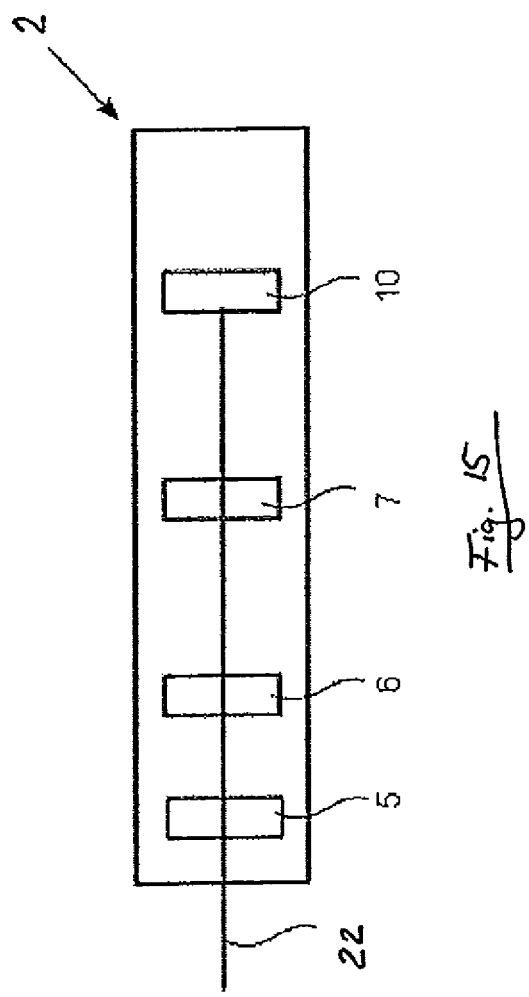

METHOD FOR OPERATING A LASER DEVICE, RESONATOR ARRANGEMENT AND USE OF A PHASE SHIFTER

The invention relates to a method for operating a laser device and the field of optical resonator arrangements, respectively. The present invention can be used particularly advantageously for the generation or fine adjustment of frequency combs. Use of the invention is also particularly advantageous in combination with the generation of short or ultrashort laser pulses. For example, the respective laser pulses can have pulse durations in the range of picoseconds or femtoseconds. However, other pulse durations are also conceivable, e.g. larger or smaller pulse durations. Also pulse durations in the range of femtoseconds to nanoseconds are advantageous.

FIG. 1a shows laser pulses in a representation of the electric field against time. Both the envelope of laser pulse 110 as well as the carrier wave 120 of laser pulse 110 are shown. Carrier wave 120 is represented by a sinusoidal oscillation in the range of optical frequencies.

FIG. 1b shows the frequency comb associated with laser pulses 110 from FIG. 1a. This frequency comb has a plurality of laser modes $f_m$ at a distance $f_{rep}$ from each other. $f_{rep}$ is the distance between vicinal modes of the frequency comb. Modes $f_m$ of the frequency comb can be described by the following formula:

$$f_m = m \times f_{rep} + f_0.$$

Thereby, m is a natural number. The modes of a real frequency comb of course extend over a finite width in the frequency domain. The parameter $f_0$ of the frequency comb is hereinafter referred to as the offset frequency of the frequency comb. The presence of this offset frequency $f_0$ causes the frequencies of the laser modes $f_m$ to be no multiples of each other. In order to adjust or otherwise control modes $f_m$ of a frequency comb, it is advantageous if the distance of vicinal modes to each other, $f_{rep}$, and/or the offset frequency $f_0$ is adjustable.

The present invention allows in particular adjusting or regulating the offset frequency $f_0$ of a frequency comb corresponding to a laser pulse in a resonator. The regulation can in a particularly advantageous manner be effected such that the mode distance $f_{rep}$ is not affected. In previously known methods for adjusting the modes of a frequency comb, both the distance of the laser modes as well as the offset frequency were usually respectively influenced when varying a single adjustable parameter.

Frequency stabilization of frequency comb generators using high-frequency beat signals is described in DE 100 44 404 A1, DE 10 2005 035 173 A1, and DE 199 11 103 B4 as well as in EP 1 372 275 B1. There, a short pulse or an ultra-short pulse oscillator is respectively provided as a frequency comb generator, i.e. a mode-coupled laser with pulse durations in the range of femtoseconds (fs) to nanoseconds (ns). When performing a Fourier transformation from the time domain to the frequency domain, a "frequency comb" corresponds to the sequence of laser pulses in the frequency domain. It is composed of a plurality of sharp δ-like functions at different discrete frequencies, referred to as modes $f_m$. Vicinal modes have a distance $f_{rep}$ from each other which corresponds exactly to the pulse repetition frequency (=repetition rate) of the oscillator and which is therefore determined by the optical path length of the pulses in the oscillator.

However, the modes of the frequency comb are normally located not exactly at an integer multiple of Δf, but the entire frequency comb is shifted by a so-called offset frequency $f_0$. The frequency comb can therefore mathematically be described as $f_m = m \times f_{rep} + f_0$. The cause of the offset frequency $f_0$ is that the group velocity of the pulses circulating in the oscillator, which determines the repetition rate and thereby the mode distance $f_{rep}$, differs from the phase velocity of the individual modes.

DE 199 11 103 A1, EP 1 161 782 B1 and DE 100 44 404 C2 describe methods how the two degrees of freedom of the frequency comb, i.e. offset frequency $f_0$ and mode distance $f_{rep}$, can be fixed or set to fixed values. A stabilizer or control loop is respectively provided for this purpose. A first stabilizer pertains to the mode distance. The pulse repetition frequency (possibly divided or multiplied into better detectable ranges), which—as explained—corresponds to the mode distance, can serve as a measurement value for this stabilizer. An evaluation and comparison unit compares the measured value with a predetermined reference value for the pulse repetition frequency. To vary the mode distance or to adjust it when deviation to the predetermined reference value is detected, the stabilizer controls an actuator that changes the optical path length of the oscillator and thereby the pulse repetition frequency. For example, a linear drive or an electro-optical element or a piezo actuator for a resonator mirror of the oscillator can be the actuator.

A second stabilizer regulates the offset frequency $f_0$ to a certain value. For this purpose, a specific mode $f_m$ of the frequency comb on a detector (e.g., a photodiode or a photomultiplier) is superposed either with an external exactly known reference frequency (e.g. by a continuous wave laser) or with a frequency-doubled mode from the same frequency comb. The superposition generates a beat frequency on the detector in the radio frequency range. An evaluation and comparison unit compares the beat frequency to a predetermined possibly variably adjustable reference frequency. Should any deviation arise, then the second stabilizer controls an actuator that varies the difference between the phase and the group delay in the oscillator. This can be done, for example, in that a resonator end mirror is slightly tilted in a resonator branch passed spatially separated by the modes to change the optical path length of the oscillator in a frequency-dependent manner. Alternatively, the oscillator losses could be varied, for example, by an intensity modulator, or in that the pump power for the oscillator is varied or a dispersive element such as a pair of prisms or a transparent tiltable plate is introduced into the beam path of the oscillator and varied in its position.

With the means described in DE 199 11 103 A1, EP 1 161 782 B1 or DE 100 44 404 C2, a fully stabilized frequency comb is overall generated, the individual modes of which are located at exactly known frequencies and mutually coherent. For the detailed description of these means, reference is made to the three above-mentioned documents.

A disadvantage of prior art is that adjustment of the offset frequency in conventional methods works only over a comparatively small range.

The object of the invention is to provide a method and an optical arrangement with which precise adjustment and setting of the offset frequency is enabled over a wider frequency range.

The object of the invention is to provide a method and an optical arrangement with which precise adjustment and setting of the offset frequency is enabled over a wider frequency range.

This object is achieved by a method having the features of claim 1, by a resonator arrangement having the features of claim 6 or 7, and by use of a phase shifter according to claim 25, respectively.

In the following, the mode of operation of the present invention shall be described.

It is known that the group delay in matter, with which e.g. the envelope of a laser pulse propagates, and the phase delay, with which e.g. the carrier wave of the laser pulse propagates, are different. This results in the fact that, in the case of a laser pulse circulating in a resonator, for every circulation a phase slip $\Delta\varphi$ arises between the carrier wave of the laser pulse and the envelope of a laser pulse. This phase slip $\Delta\varphi$ is shown e.g. in FIG. 1a. Such a phase slip is also defined in general for laser light.

The following embodiments are each, though not explicitly noted, both applicable for general laser light circulating in a resonator as well as for laser pulses.

For a laser pulse circulating in a resonator, there exists a relationship of the phase slip for every circulation in the resonator to the offset frequency $f_0$ of the associated frequency comb. This relationship can be represented by the formula $f_a = \Delta\varphi/(2\pi T_{circulation})$. Thereby, $T_{circulation}$ is the time required by the laser pulse for one circulation in the resonator. Therefore, the offset frequency can be adjusted by varying the phase slip. This is done in the present invention in a novel and particularly advantageous manner.

In a method or a resonator according to the invention, respectively, an adjustable phase shifter is present. When passing through the phase shifter, a geometric phase is imparted to the carrier wave of a laser pulse circulating in the resonator, in particular without the group delay changing. The phase slip between the carrier wave and the envelope of the pulse per circulation is thereby varied.

If the geometric phase, which is imparted to the carrier wave of a laser pulse circulating in the resonator per resonator circulation, is varied, then also the offset frequency $f_0$ of the associated frequency comb is thereby varied. With the adjustability of the geometric phase according to the invention, the offset frequency $f_0$ of a frequency comb is therefore adjustable or controllable.

One way to vary the geometric phase imparted to the carrier wave of the laser pulse per resonator circulation shall now be illustrated with reference to a particularly advantageous option.

According to several embodiments of the present invention, the geometric phase that is imparted to a carrier wave of a laser pulse circulating in a resonator is realized by varying the orientation or also other properties of a birefringent and/or a polarizing element in the resonator. The polarization of the laser pulse is therefore changed. As is well known, see for example, Bergmann Schaefer, "Lehrbuch der Experimentalphysik", Volume 2, 8$^{th}$ edition "Elektromagnetismus", pages 418 et. seqq., the polarization states of light can be represented on the so-called Poincaré sphere.

A geometric phase is imparted to a light beam whose polarization is varied in a specific manner. It can be particularly advantageous if the polarization of the light beam travels a closed path on the Poincaré sphere. It can further be advantageous if the polarization travels the closed path on the Poincaré sphere by various unitary operations. However, other paths on the Poincaré sphere are also possible which lead to imparting a geometric phase.

FIG. 2 shows a Poincaré sphere for the polarization state of a laser pulse. States located on the equator of the Poincaré sphere (e.g. points A and C in FIG. 2) have a linear polarization. The position of the point on the equator of the Poincaré sphere indicates the direction of the linear polarization. Points located at the poles of the Poincaré sphere (points B and D in FIG. 2) indicate the two circular polarization states (right-circularly and left-circularly). FIG. 2 shows a change of the polarization state of a laser pulse which leads to a geometric phase being imparted to the carrier wave of the laser pulse. In the initial state A, the laser pulse is polarized linearly. Starting out from there, it is transformed to a circular polarization (point B). Form there, the polarization is again turned to a linear polarization, however different from the initial polarization A (point C). From this second linear polarization at point C, the polarization of the laser pulse is transformed to a second circular polarization (at point D) opposite to the first circular polarization (at point B). From there, the polarization of the laser pulse is again transformed to the linearly polarized initial state at point A. When passing this polarization path, the carrier wave of the laser pulse acquires a geometric phase.

With respect to monochromatic light outside a resonator, this effect of acquiring a geometric phase when passing through certain polarization states is known as the Pancharatnam phase.

As can be gathered e.g. from the publication T. H. Chyba et al., Optics Letters Vol. 13 No. 7 p. 562 "Measurement of the Pancharatnam phase for a light beam" (there, however, only for monochromatic light), the Pancharatnam phase acquired is dependent upon the path traveled on the Poincaré sphere. The geometric phase acquired is in particular dependent upon the area enclosed by the path traveled on the surface of the Poincaré sphere. By varying the path on the Poincaré sphere, i.e. by varying certain polarization states of light, the geometric phase acquired can be varied.

Enabled by the physical effects described above, a method of operating a laser device is provided according to the invention. The method comprises the step of providing a mode-coupled laser pulse in a resonator so that the laser pulse circulates in the resonator. Furthermore, the method comprises determining an offset frequency $f_0$ of the frequency comb corresponding to the laser pulse, the frequency comb having a plurality of laser modes $f_m$ at a distance $f_{rep}$ from one another, the frequencies of which can be described by the formula $f_m = m * f_{rep}\ f_0$. Where $f_m$, $f_{rep}$ and $f_0$ are frequencies and can be given e.g. in Hertz. m is a natural number. m can also be 0. The method according to the invention further comprises varying the offset frequency $f_0$ by varying the geometric phase which imparts a phase lag in comparison to the unvaried state to the carrier wave of the laser pulse per circulation in the resonator.

In a particularly advantageous manner, varying the geometric phase can be effected such that the group circulation time of the laser pulse $T = 1/f_{rep}$ in the resonator is not varied. In a case ideal for some applications, the group circulation time of the laser pulse in the resonator can remain entirely constant. However, it is clear to the person skilled in the art that this is normally not exactly achieved in real-world applications. Within the meaning of the present application, the feature that the group circulation time of the laser pulse in the resonator is not varied is to be understood such that the group circulation time of the laser pulse in the resonator either remains exactly constant, or varies by less than 0.1%, by less than 0.5%, by less than 1%, by less than 2%, by less than 5% by less than 10% or by less than 20%. Since the distance $f_{rep}$ of the laser modes from one another is related to the group circulation time of the laser pulse in the resonator, $f_{rep}$ can therefore within the above meaning also be constant or not be substantially varied when varying the geometric phase of the carrier wave of the laser pulse. Advantageously, but not necessarily, varying the geometric phase can be achieved by varying the orientation of a birefringent or a polarizing element. Thereby the birefringent or polarizing element can be provided in the resonator. The geometric phase, which imparts a phase delay per resonator circulation to the carrier wave of a laser pulse circulating in the resonator, can be varied in particular by rotating a birefringent or polarizing element about its own axis or the optical axis of the resonator. To vary the geometric phase imparted to the laser pulse, or to adjust it, other methods are of course usable. Other methods can in particular be used to vary the polarization state of the laser pulses and thereby adjust and vary the offset frequency $f_0$ of the associated frequency comb.

One embodiment of the method according to the invention that is applicable in a particularly versatile manner is a control method for controlling the offset frequency of a frequency comb. For this purpose, the step of determining the offset frequency $f_0$ of the laser pulse circulating in the resonator is performed several times. For example, this step can be performed continuously at fixed intervals. Determining the offset frequency can comprise taking a measurement. Such a measurement can comprise e.g. an absolute measurement of $f_0$. However, this is not necessary. It is also possible that determining the offset frequency $f_0$ comprises measuring the position of the frequency comb with respect to a different laser or a further frequency comb. In this manner, e.g. absolute or relative determination of the position of the frequency comb modes $f_m$ can be performed. Based on the frequency offset $f_0$ last measured, the geometric phase which imparts the phase delay to the carrier wave of the laser pulse per resonator circulation can be varied. In particular, the nature of the variation of the orientation of the birefringent and/or the polarizing element can be determined by the offset frequency $f_0$ last measured. A control method for the offset frequency can be provided by repeatedly consecutively performing the steps of determining the offset frequency and varying the offset frequency by varying the geometric phase.

Before the laser pulse impinges the birefringent and/or the polarizing element, the polarization of the laser pulse can be turned into an elliptical or circular polarization. Particularly advantageous is a circular polarization at the location of the birefringent element, since no delay in the group circulation time then arises due to the change in orientation of the birefringence. The path on the Poincaré sphere e.g. shown in FIG. 2 can thus be realized.

Both only one as well as several (e.g., 2, 3, 4 or 10) adjustable birefringent or polarizing elements can be provided.

The invention further relates to a resonator arrangement for acquiring or generating laser pulses. The resonator arrangement comprises a resonator in which the laser pulses can circulate. Furthermore, an active medium for amplifying the laser beams can be provided in the resonator. In addition, an element that is adapted to bring about mode coupling can be present in the resonator. An outcoupling device can be provided for coupling out laser pulses from the resonator arrangement. This can in particular be an outcoupling mirror.

The phase shifter according to the invention in its function as an offset shifter can be installed in any mode-coupled laser. These are in particular conventional solid state (z.B.Ti:Sat) fs lasers, as they have already long been known. The laser resonator can thereby take both the shape of a linear resonator as well as the shape of a ring resonator. Also the repetition rate can fluctuate significantly depending on the field of application. It can be located, for example, between 10 MHz and 10 GHz.

E.g. a Ti:Sa laser can be used. Also other laser crystals can be used, such as e.g. ER:glass, Yb:YAG, Cr:LiSAF, Cr:forsterite, etc. The dispersion compensation in such lasers is advantageously effected via so-called chirped or double-chirped mirrors.

The resonator arrangement comprises a measuring device for determining the offset frequency $f_0$ of the frequency comb corresponding to the laser pulses, where the frequencies of the modes $f_m$ of the frequency comb can again be described by the formula $f_m = m*f_{rep} + f_0$. Arranged within the resonator is at least one birefringent or polarizing element being variable in its orientation in such a way that with a variation in the orientation of the at least one birefringent or polarizing element, the geometric phase, which imparts a phase delay to the carrier wave of a laser pulse circulating in the resonator per resonator circulation, is variable. The offset frequency $f_0$ of the frequency combs associated with the laser pulse is thereby variable.

The resonator arrangement described in the preceding paragraph is suitable for performing the method of operating a laser device described above.

In another embodiment, an active or passive resonator arrangement with a resonator for receiving laser radiation is provided. In particular laser pulses can also be received. At least one adjustable birefringent or polarizing element is disposed In the resonator. As described above, this birefringent or polarizing element while varying a geometric phase, which imparts a phase delay to an optical wave per resonator circulation, effects a different delay for the phase and group circulation time in the resonator. This can occur in such a manner that when the adjustable element is varied, the circulation losses of a laser pulse in the resonator are not or not substantially varied.

Circulation losses of a laser pulse in the resonator not or "not substantially" being varied can within the sense of the present application be understood as meaning that the circulation losses of the laser beams in the resonator remain totally constant or are varied by less than 0.1%, by less than 0.5%, by less than 1%, by less than 2%, by less than 5%, by less than 10%.

The feature that the at least one birefringent or polarizing element is adjustable can mean in particular that its orientation is variable. For this purpose, for example, an actuating element can be provided. The birefringent or polarizing element, however, can also be electrically actuatable and thereby adjustable. For example, the polarizing effect of the birefringent element or the polarizing element can be variable by applying an electrical signal The influence of the birefringent or the polarizing element on the polarization direction of the laser beams or in particular of laser pulses can be variable in particular by applying an electrical signal.

It has proven to be particularly advantageous to change the orientation of the birefringence of the birefringent element or to rotate the birefringent or polarizing element. Such rotation can in particular be effected about an axis parallel to the propagation direction of the laser light, e.g. about the optical axis of the resonator or of the element itself. The optical axis of the resonator can thereby correspond to the path traveled by the laser beams circulating in the resonator. By varying the orientation of the birefringence or by rotating the birefringent or polarizing element, respectively, the phase and/or group delay can be varied.

It can thereby be particularly advantageous to have the variation of the phase circulation time of the carrier wave of the laser pulse not or "not substantially" change the group circulation time of the pulse (within the meaning of the abovementioned percentage deviations).

In the presence of a frequency comb, this varying allows for controlling or regulating and adjusting the offset frequency of the frequency comb without affecting or influencing the distance of vicinal modes. Separate control of the offset frequency is there given. Of course, such an arrangement can be combined with a device which enables separate adjustment of the distance of vicinal modes. This can be achieved e.g. in that the resonator length is variable. For example, a shiftable in particular piezoelectrically shiftable end mirror of the resonator or an electro-optical element can then be provided.

It is useful for many applications to provide an active medium in the resonator, in particular a laser-active medium. The laser beams circulating in the resonator can thereby be amplified. In addition, the resonator can comprise an element for generating mode-coupled laser pulses, e.g. a Kerr-lens, a saturable absorber or a NOLM loop.

A resonator arrangement according to the invention can further comprise an actuating device 60 which is configured for varying the difference of the phase and the group delay in the resonator. For this purpose the actuating device 60 can be configured to adjust the at least one adjustable birefringent or polarizing element. This can in particular be done in that the spatial orientation of the birefringent or polarizing element is variable by the actuating device 60. This adjustment can in particular comprise a rotation about the optical axis of the resonator. It is also conceivable that the actuating device 60 uses a signal, e.g. an electrical signal to vary the polarization properties of the adjustable birefringent or polarizing element, without changing its spatial orientation. This can e.g. be useful when the birefringent or polarizing element is adjustable by way of the electro-optical effect. Such actuation can be implemented also in an embodiment of the birefringent or polarizing element as a liquid crystal, in particular, as a ferroelectric liquid crystal. Alternatively, the polarization properties of the birefringent or polarizing element can be adjustable by mechanical pressure upon the latter. Here as well, a suitable actuating device 60 can be provided.

The resonator device can further comprise a control device 80 which is configured to send a control signal to the actuating device 60. A measuring device 90 for determining the offset frequency $f_0$ is additionally provided. The control signal can be generated depending on the offset frequency determined by the measuring device 90. Controlling the offset frequency can thus be implemented.

It is particularly advantageous if the birefringent or polarizing element is a delay element with a phase difference of $\pi$ or $\pi/2$, in particular, a half or a quarter-wave plate with respect to the wavelength of the carrier wave. Such optical elements have polarization properties, for example, variable by a rotation about the optical axis of the resonator. The resonator arrangement according to the invention can be a free-space optical device. Alternatively, such a resonator arrangement can be completely or at least in part formed in a waveguide 35. In particular the birefringent or polarizing element can be formed with electro-optical material in a waveguide 35.

It is also provided in some embodiments that not only one adjustable birefringent element and/or a polarizing element is provided in the resonator, but that a plurality of adjustable birefringent elements and/or polarizing elements are present. They can be identical adjustable polarizing elements. It can in particular be advantageous if the plurality of birefringent and/or polarizing elements are adjustable separately. One separate actuating element can be provided for each of the plurality of adjustable birefringent and/or polarizing elements. Alternatively, all birefringent and/or polarizing elements can be adjusted together by way of one actuating element. It can be advantageous to provide one or several slowly variable birefringent and/or polarizing elements and one or more quickly adjustable elements. The plurality of adjustable birefringent elements and/or polarizing elements can be arranged consecutively in the resonator. It is alternatively also conceivable that several non-adjustable, i.e. fixed birefringent and/or polarizing elements are provided.

It can in particular be advantageous if the geometric phase, which imparts a phase delay to an optical wave per resonator circulation, or which is imparted to the carrier wave of a laser pulse circulating in the resonator per resonator circulation, can be modulated with a high frequency. This can mean that the birefringent and/or polarizing elements are adjustable with a high frequency. For example, they can be adjustable with a frequency of more than 100 kHz. This reaches well beyond the adjustment possibilities with known actuating elements, such as mechanical, thermal actuators, or adjustment of the pump power. Already known faster actuating elements are based solely on intensity modulation of the laser.

It is furthermore advantageous if the geometric phase can be continuously adjusted. Stepless variable control of the geometric phase and thereby of the offset frequency can be implemented. In particular the frequency comb can thereby be shifted by more than a free spectral range.

In the resonator, a first polarization varying element can additionally be provided which is configured to turn a linearly polarized laser pulse into a circularly or elliptically polarized laser pulse. It can thereby be ensured that laser light or a laser pulse is circularly or elliptically polarized when it strikes the birefringent and/or polarizing element. A second polarization varying element can further be provided which is configured to turn a circularly or elliptically polarized laser pulse into a linearly polarized laser pulse. Advantageously, the one or the several birefringent polarizing elements are disposed in the resonator between the first and the second polarization varying elements.

Initially, e.g. linearly polarized laser light or a linearly polarized laser pulse is polarized circularly or elliptically by the first polarization varying element, then passes through the one or the several birefringent or polarizing elements and is then again linearly polarized by the second polarization varying element. In an advantageous realization, a polarizer is provided at the input and/or output to suppress small deviations from the ideal linear polarization. This improves the polarization extinction ratio and avoids intensity modulations in the spectrum.

The configuration with first and a second polarization varying elements is particularly advantageous in combination with a ring resonator. It is alternatively also possible that the resonator is a linear resonator. Then it can be sufficient that the resonator comprises a first polarization varying element. The latter can be configured like the first polarization varying element of a ring resonator. Laser light, in particular linearly polarized laser light, passes through the first polarization varying element and is polarized circularly or elliptically by the latter. The laser light subsequently passes through the one or the several birefringent or polarizing elements and is then reflected by a resonator end mirror arranged therebehind in order to again traverse the one or the several birefringent or polarizing elements in the opposite direction. The laser light or the laser pulse, then again passes through the first polarization varying element, this time in the opposite direction. This again results in linear polarization.

In a resonator thus configured, the one or the several birefringent or polarizing elements are with each passage through the resonator passed twice by the laser pulse, namely in each case in the opposite direction.

A further aspect of the present invention is the use of a phase shifter having at least one birefringent or polarizing element that is variable in its orientation for adjusting an offset frequency $f_0$ of a frequency comb that corresponds to a laser pulse passing through the phase shifter. The frequency comb can thereby, as described above, by described by the formula $f_m = m*f_{rep} + f_0$.

Figure 3:
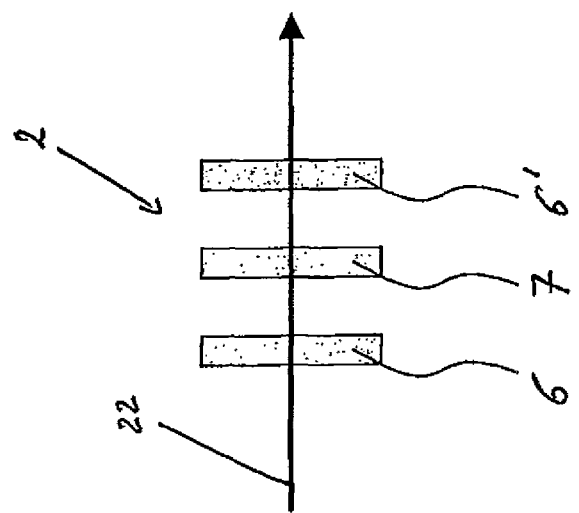
Figure 6:
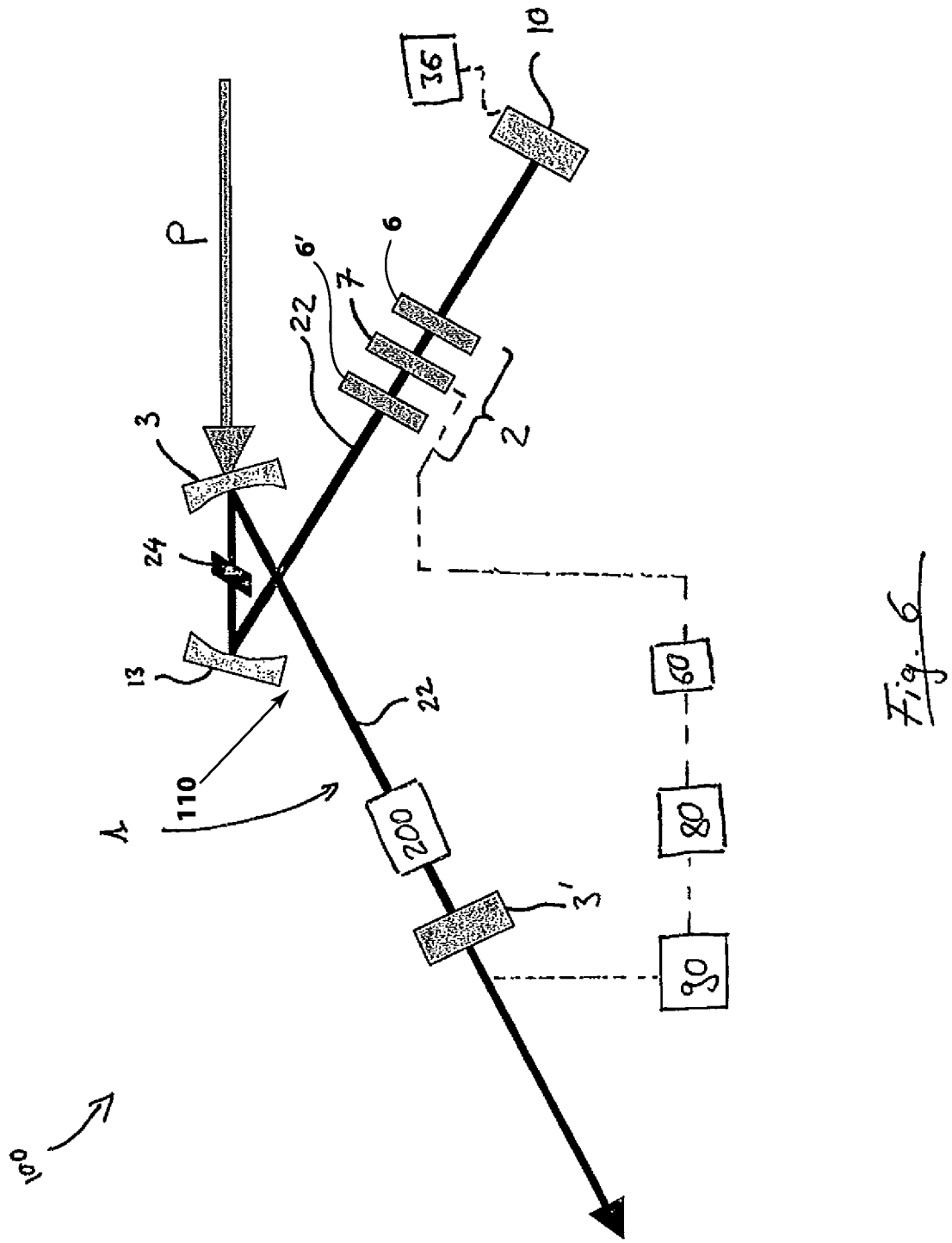
Figure 7:
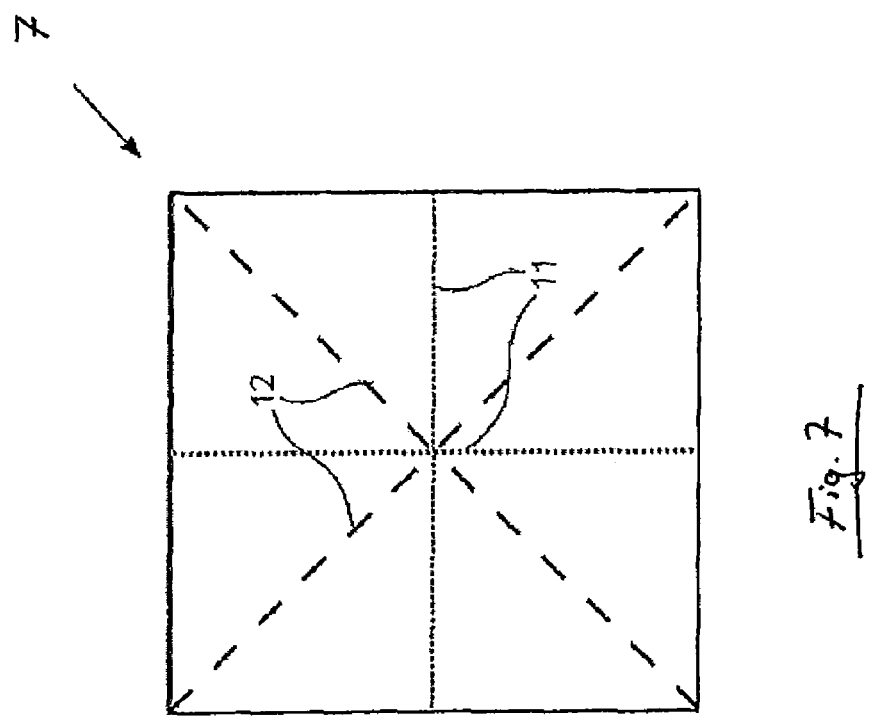
Figure 8:
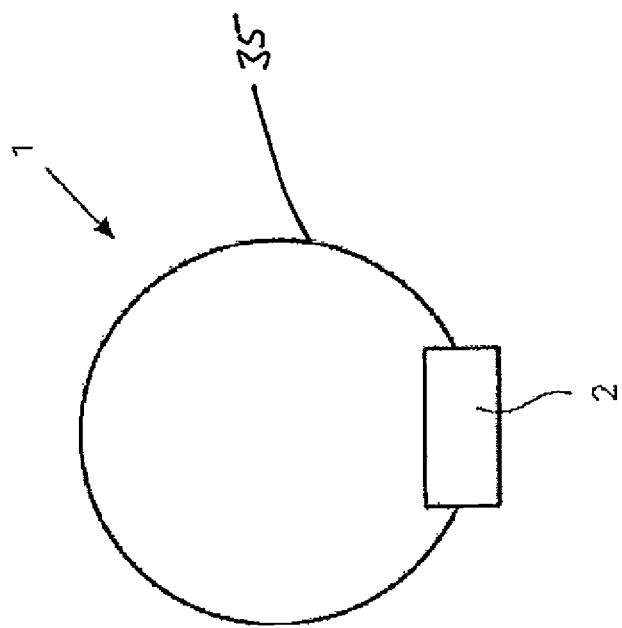
Figure 9:
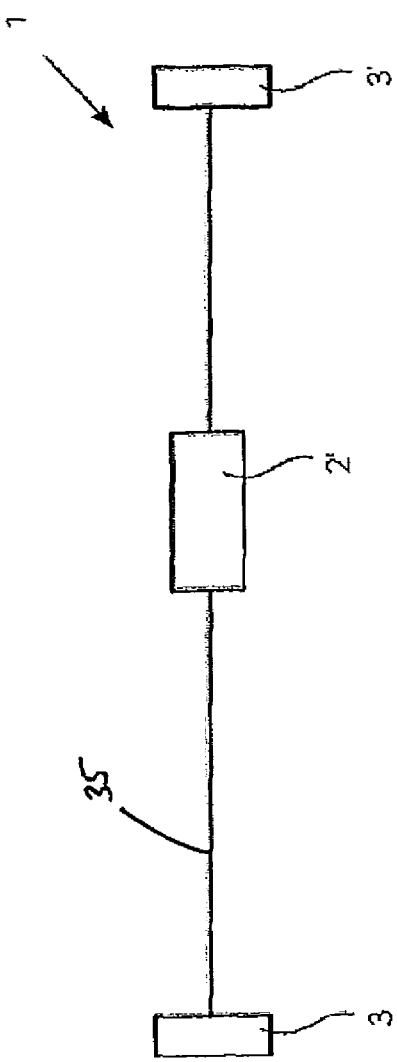

The invention and its advantages shall hereafter be further described with reference to the drawings, where:

FIG. 1A: shows two consecutive laser pulses of a pulse train with the pulse repetition frequency $f_{rep}$ and the associated carrier waves, where the vertical axis shows the time and the horizontal axis the electric field, FIG. 1B: shows the frequency comb associated with the laser pulses of FIG. 1A, where the vertical axis shows the frequency and the horizontal axis the intensity, FIG. 2: shows a representation of a laser pulse in a resonator of an embodiment according to the invention when traveling the path through phase shifter according to the invention in the polarization space by way of the Poincaré sphere, FIG. 3: shows a phase shifter for use in a resonator, in particular a ring resonator according to one embodiment, FIG. 4: shows a phase shifter and an associated reflector (resonator end mirror) for use in a resonator, in particular a linear resonator, of one embodiment, or a ring resonator with a sigma arm, FIG. 5: shows a schematic representation of a resonator arrangement according to one embodiment with a ring resonator, FIG. 6: shows a resonator arrangement 100 according to one embodiment with a linear resonator, FIG. 7: shows a schematic representation of a birefringent element for use in a resonator according to the invention, FIG. 8: shows a schematic representation of a ring resonator according to the invention, FIG. 9: shows a schematic representation of a linear resonator according to the invention, FIG. 10: shows a schematic representation of a resonator according to the invention in an embodiment with an optical fiber, FIG. 11: shows a schematic representation of a portion of a resonator according to the invention, FIG. 12: shows a schematic representation of a portion of a resonator according to the invention with an optical fiber and a beam splitter, FIG. 13: shows a schematic representation of a portion of a resonator according to the invention as free space optics with a beam splitter, FIG. 14: shows a schematic representation of a phase shifter with a birefringent or polarizing element for use in a linear or ring-shaped resonator, FIG. 15: shows a schematic representation of a phase shifter with a birefringent or polarizing element for use in a linear resonator.

FIG. 5 shows an inventive resonator arrangement 100 with a resonator 1. The resonator shown in FIG. 5 is a ring resonator. Alternatively, a resonator arrangement 100 according to the invention can also comprise a linear resonator. Such is shown in FIG. 6.

Ring resonator 1 of FIG. 5 comprises several mirrors 3, 13, some of which may be curved mirrors. Mirror 3 is an incoupling mirror which is adapted to couple in pump light P. Mirror 3' is an outcoupling mirror for coupling out laser light from resonator 1. This can be CW laser light (continuous wave) or pulsed laser light.

It is for some applications advantageous to provide an active medium 24 in the resonator. This can be, for example, a laser-active medium such as a Ti:Sa crystal. Of course, other laser media are also conceivable. Deflecting mirrors 13 are provided in resonator 1 for beam guidance. It can thereby be useful to have some mirrors be curved. For example, it can be advantageous for dispersion compensation in resonator 1 if one of the mirrors, for example, one of mirrors 13, is a chirped mirror.

Reference numeral 2 in FIG. 5 denotes the phase shifter of resonator 1. It is provided along the optical axis 22 of resonator 1. Phase shifter 2 comprises an adjustable birefringent or polarizing element 7. This can in particular be a delay element having a phase difference of $\pi$ or $\pi/2$. A $\lambda/2$ plate is particularly advantageous for many applications.

Birefringent or polarizing element 7 can be variable due to the electro-optic effect. Alternatively, the polarization properties of birefringent or polarizing element 7 can be adjustable by mechanical pressure. Element 7 can also be a liquid crystal, in particular a ferroelectric liquid crystal. Depending on the configuration of element 7, a suitable actuating element 60 can be provided to adjust birefringent or polarizing element 7. Adjusting within this meaning refers to varying or adapting or adjusting to a desired value of the polarization properties of element 7. In the case of a wave plate, adjustment can be effected, for example, by a rotation about resonator axis 22. In addition, resonator 1 comprises an element 200 for generating mode-coupled laser pulses, e.g. a Kerr-lens or a saturable absorber.

Furthermore, phase shifter 2 comprises a first polarization varying element 6. It is configured to circularly or elliptically polarize a linearly polarized laser pulse 110. If linearly polarized laser light impinges phase shifter 2 in FIG. 3 from the left onto polarization varying element 6, then it is by the latter polarized circularly or elliptically to then impinge birefringent or polarizing element 7 where the polarization is again varied.

Behind birefringent or polarizing element 7 on the side opposite to first polarization varying element 6, a second polarization varying element 6' is provided. It is configured to linearly polarize circularly or elliptically polarized light. The laser light therefore exits phase shifter 2 again in the linearly polarized state. Of course, this arrangement is applicable for both continuous wave (CW) laser light as well as for pulsed laser light, in particular also for short and ultrashort pulses.

FIG. 6 shows the embodiment of resonator arrangement 100 according to the invention with linear resonator 1. There, the same elements are provided as in the ring resonator shown in FIG. 5. For greater clarity, the same reference numerals are used. Phase shifter 2 shown in FIG. 3 can likewise be employed as phase shifter 2. In contrast to the ring resonator shown in FIG. 5, however, the latter is passed twice in the linear resonator per resonator circulation.

Both in the embodiment with a ring resonator as well as in the embodiment with a linear resonator, polarization varying elements 6, 6' can in contrast to the at least one adjustable birefringent or polarizing element 7 be fixedly set. Alternatively, it is conceivable to configure these elements adjustable as well. However, this is not necessary. It has proven to be particularly advantageous to have polarization varying element 6, 6' be λ/4 plates.

In order to make due with a smaller number of optical elements and thereby save costs, phase shifter 2 shown in FIG. 4 can in the case of a linear resonator also be used in a particularly advantageous embodiment. End mirror 10 of the linear resonator is thereby incorporated into the assembly. Only one polarization varying element 6 is provided. The at least one adjustable birefringent or polarizing element 7 is arranged between polarization varying element 6 and the end mirror 10 of the resonator. Light traveling through the resonator passes through polarization varying element 6, then adjustable birefringent or polarizing element 7, in order to then be reflected by resonator end mirror 10 and again travel through elements 7 and 6 in the reverse order and opposite direction.

Adjustable birefringent or polarizing element 7 can also be a λ/4 plate. Here as well, adjustability is conceivable by a rotation about resonator axis 22.

Resonator arrangement 100 further comprises a controllable actuating device 36 which enables separate adaptation of the distance of vicinal modes. This can be achieved e.g. in that the resonator length is variable. For example, a shiftable, in particular piezoelectrically shiftable, end mirror 13 of resonator 1 can be provided.

FIGS. 14 and 15 show further embodiments of a phase shifter 2.

FIG. 14 illustrates a phase shifter 2 which is adapted in particular for use in a ring resonator. In contrast to the phase shifter shown in FIG. 3, two polarizers 5, 9 are provided. They are arranged such that they include the configuration of FIG. 3. These polarizers are therefore arranged at the input or output of phase shifter 2. They serve to prevent residual deviations of the polarization. This can be useful because it is advantageous if the laser light circulating in the resonator or laser pulses 110, respectively, are polarized identically before and after passing through the polarizer. Since this is not always ensured due to tolerances of elements 6, 6' or 7 or other elements, polarizers 5, 9 can be used in order to prevent residual deviations from the ideal linear polarization.

FIG. 15 shows a similar application which is in particular designed for use in a linear resonator. There, a polarizer 5 has been added to respective phase shifter 2 of FIG. 5. As shown in FIG. 15, the latter is located on the side of phase shifter 2 opposite to end mirror 10 on the optical axis of the resonator. Since this polarizer 5 is passed both during entry of laser light or laser pulses 110, respectively, into phase shifter 2 as well as during their exit, no second polarizer is necessary so that costs can be saved.

Several polarizers 5, 9 can of course also be arranged consecutively.

A cascaded configuration has proven to be particularly advantageous for some applications. Several respective birefringent and/or polarizing elements can for this be provided e.g. in FIG. 3, 4, 14 or 15 instead of one birefringent or polarizing element 7. They can then be provided consecutively along the optical axis of the resonator. It is particularly advantageous if e.g. a plurality of consecutively switched adjustable λ/2 plates is provided.

For example, such a cascaded configuration is advantageous where e.g. the rotation range of a single plate is limited for mechanical or other reasons. It is particularly advantageous if each of the birefringent or polarizing elements 7 is separately adjustable. It is in this respect also particularly interesting to combine different actuating elements, for example, with a different rotation range and/or different actuating speed. A rotation range is to be understood as being the change of the polarization angle which can be reached by element 7.

FIG. 7 shows a particularly advantageous embodiment of birefringent or polarizing element 7. It is an electro-optical modulator which has static birefringence differing from 0 with respect to a first pair of axes 11. This birefringence and axes 11 can be fixed by the orientation of the electro-optic modulator. Electro-optical modulator 7 has an additional induced birefringence with respect to a further pair of axes 12 which differs from the first pair of axes. Ideally, first pair of axes 11 and second pair of axes 12 can be tilted by 45° relative to each other. The additional birefringence with respect to the other pair of axes 12 can be e.g. electrically or mechanically oriented and thereby be adjustable.

Described in literature is a configuration in which a rotatable half-wave plate is by way of sufficiently high voltage realized with an EO crystal of 1×1×20 mm in length. For that, two electric fields $Ex=E0*\sin(phi)$ and $Ey=E0*\cos(phi)$ are applied to the crystal, where E0 is the field which generates birefringence with phase delay Pi, depending on the choice of field orientation along two pairs of axes 11, 12 tilted relative to each other by 45°. Despite the very small aperture (1 mm), the long crystal length (20 mm) and the use of the double passage, a voltage of ~200 V is needed. Modern implementations use waveguides that can use lower voltages, but require fields just as high. It is in both implementations due to the high fields difficult to maintain the operating point stable For small modulations, however, $\cos(phi)$ can be approximated to ~1, and $\sin(phi)=phi$. If one by tilting the crystal (presently propagation direction approximately z-direction) produces a static birefringence at the size of Pi, then only slight modulation of a field (here Ex) is needed and drifts are eliminated. Advantages do not only include low drift but also minor insertion loss (as compared, for example, with the waveguide solution).

Although it is at least for some embodiments better, in particular for the use with short laser pulses 110 and the frequency comb corresponding thereto, if the adjustable birefringent or polarizing element only affects the geometrical phase that is imparted to the laser pulse with a single passage through the resonator, it can also be advantageous if a changed setting of the birefringent or polarizing element simultaneously causes a propagation delay of the laser pulse through the resonator. The distance of vicinal modes of the frequency comb in the frequency domain can simultaneously be varied. It is conceivable, for example, that an angle rotation of adjustable birefringent or polarizing element 7 or several thereof simultaneously causes a propagation delay.

Phase shifter 2 according to the invention can also be incorporated into fiber lasers. For this purpose, either a short free-space member is necessary or a waveguide variant of phase shifter 2 is used. FIG. 8 in a schematic manner shows a phase shifter 2 installed into a resonator arrangement 100 of a fiber laser. This is an embodiment as a ring resonator. FIG. 9 schematically illustrates the implementation of a phase shifter 2 according to the invention into a fiber laser with a linear resonator 1.

FIG. 10 schematically shows a variant in which phase shifter 2 according to the invention is incorporated in the free-space region of a fiber laser with a ring resonator 1. The respective fiber lasers can be doped fiber lasers.

Elements 11 and 15 of FIG. 10 represent collimators that allow coupling out and coupling in light into a respective optical fiber 35. Element 130 is a beam splitter which is used for coupling out light, in particular laser light or pulsed laser light from resonator arrangement 100.

A further specialized configuration of a resonator arrangement 100 according to the invention can be obtained by a loop 300 or a loop mirror 300, respectively, in combination with a polarizing beam splitter 50. It is thereby achieved that the assembly is independent of the incident polarization. FIG. 13 shows such an arrangement as free-space optics, whereas FIG. 12 illustrates a corresponding arrangement as fiber optics. Port 18 of polarizing beam splitter 50 serves as the input for laser light, in particular pulsed laser light. In the fiber optics shown in FIG. 12, light can from port 18 in reflection via collimator 16 be coupled into the fiber or by transmission via collimator 17 be coupled in on the opposite end of the fiber. This occurs in dependence of the polarization. Since collimators 16 and 17 are connected in a looped manner via the fiber in which phase shifter 2 is located, two polarizations circulate in opposite direction to each other in the fiber through the loop. After circulation, the two polarizations are at the beam splitter 50 again superimposed and leave the arrangement at port 19 in transmission or at port 18 in a reflection This can depend, for example, on the twist of the fibers. When used in reflection, the combination with a Faraday rotator and further wave plates can be useful to unmirror polarization.

In the free-space optics shown in FIG. 13, port 18 likewise serves as the input to a free-space loop comprising phase shifter 2. The loop configuration can, as shown in FIG. 13, be realized by mirrors 60, 70. Similar to the function of the fiber loop shown in FIG. 12, the two polarizations here as well travel in opposite direction to each other through the loop. They are at the beam splitter again superimposed and leave the assembly presently depending on the setting of the λ/4-plates at port 19 in transmission or at port 18 in reflection.

It applies for all embodiments of the invention that the one or several adjustable birefringent or polarizing elements 7, 9 can be formed as achromatic wave plates. This again ensures that no influence by the wave plate on the group velocity of a laser pulse circulating in the resonator is given and the offset frequency $f_0$ of a frequency comb associated with the laser pulse can be adjusted independent of the distance of vicinal modes of the frequency comb. Chromatic wave plates could cause the group circulation time to change when adjusting the wave plates.

The invention extends inter alia to the following embodiments:

1. Method for operating a laser device comprising the steps of:
    a) providing a laser pulse (10) in a resonator (1) so that said laser pulse (10) circulates in said resonator (1), said laser pulse (10) having a carrier wave (12),
    b) determining an offset frequency $f_0$ of the frequency comb corresponding to said laser pulse (10), said frequency comb having a plurality of laser modes $f_m$ at a distance $f_{rep}$ from one another, the frequencies of which can be described by the formula $f_m=m*f_{rep}+f_0$, m being a natural number, and
    c) varying said offset frequency $f_0$ by varying a geometrical phase that is imparted to said carrier wave (12) of said laser pulse (10) per resonator circulation.
2. Method according to embodiment 1, characterized in that varying said geometric phase is performed such that the group circulation time of said laser pulse (10) in said resonator (1) is thereby not changed and $f_{rep}$ is therefore not or not significantly changed.
3. Resonator arrangement for generating laser pulses (10), wherein said resonator arrangement comprises a resonator (1), an active medium (24) and an outcoupling device (3') for coupling out laser pulses (10) from said resonator, characterized in that
    said resonator arrangement comprises a measuring device for determining an offset frequency $f_0$ of the frequency comb corresponding to said laser pulses (10), said frequency comb having a plurality of laser modes $f_m$ at a distance $f_{rep}$ from one another, the frequencies of which can be described by the formula $f_m=m*f_{rep}+f_0$, m being a natural number, and that
    at least one birefringent or polarizing element (7) being variable in its orientation is arranged within said resonator (1) in such a way that, with a variation in the orientation of said at least one birefringent or polarizing element (7), the geometric phase (Δφ) which is imparted to the carrier wave (12) of a laser pulse (10) per resonator circulation is variable and the offset frequency $f_0$ of the frequency comb associated with said laser pulse (10) is thereby variable.
4. Resonator arrangement with a resonator (1) for receiving laser radiation, in particular laser pulses, characterized in that
    at least one adjustable birefringent or polarizing element (7) is arranged within said resonator (1), which by varying a geometric phase that is imparted to an optical wave, in particular to the carrier wave (12) of said laser radiation, per resonator circulation causes a different delay for the phase and group circulation times, and that
    when varying the setting of said adjustable birefringent or polarizing element, the circulation losses of the laser radiation, in particular of said laser pulse (10), are not or not substantially changed in said resonator (1).
5. Resonator arrangement according to embodiment 4, characterized in that varying the phase and/or group delay is achievable by changing the orientation of the birefringence of said birefringent element (7) or by rotating said birefringent or polarizing element (7) about the optical axis (22) of said resonator (1).
6. Resonator arrangement according to embodiment 4 or 5, characterized in that the polarization of said laser light, in particular of said laser pulse (10), at said at least one birefringent or polarizing element (7) is circular or substantially circular.
7. Resonator arrangement according to one of the embodiments 4 to 6, characterized in that said resonator (1) comprises an active medium (24) and an outcoupling device (3'), and in addition comprises an element which is adapted to generate mode-coupled laser pulses (10) in said resonator (1).
8. Resonator arrangement according to one of the embodiments 4 to 7, characterized in that
    said resonator (1) is adapted to receive a plurality of modes which are characterized by the frequencies $f_m$ and can be substantially described by the formula $f_m=m*f_{rep}+f_0$, where $f_{rep}$ is the distance of vicinal modes and m is a natural number, and that
    said resonator arrangement comprises a measuring device for determining the offset frequency $f_0$ which determines the position of the resonator modes in the frequency domain in absolute or relative terms, and that
    the position of said modes is variable by said at least one birefringent or polarizing element (7).
9. Resonator arrangement according to one of the embodiments 4 to 8, characterized in that said resonator arrangement comprises a control device which is configured to send a control signal to the actuating device, where said control signal is dependent upon the offset frequency determined by said measuring device.

10. Resonator arrangement according to one of the embodiments 4 to 9, characterized in that said at least one birefringent or polarizing element (7) is a delay element with a phase difference of Pi or Pi/2, in particular a half or quarter wave plate, in particular an achromatic wave plate.

11. Resonator arrangement according to one of the embodiments 3 to 10, characterized in that said at least one birefringent or polarizing element (7) can be adjusted by the electro-optic effect or by mechanical pressure, said at least one element (7) comprises a liquid crystal, in particular a ferro-electric liquid crystal, and/or said at least one element (7) is formed in a waveguide with electro-optical material.

12. Resonator arrangement according to one of the embodiments 3 to 11, characterized in that the geometric phase can be continuously adjusted and/or modulated with high frequency, in particular of 100 kHz or above.

The invention claimed is:

1. Method for operating a laser device comprising the steps of:
    a) providing a laser pulse in a resonator so that said laser pulse circulates in said resonator, said laser pulse having a carrier wave,
    b) determining an offset frequency $f_0$ of the frequency comb corresponding to said laser pulse, said frequency comb having a plurality of laser modes $f_m$ at a distance $f_{rep}$ from one another, the frequencies of which can be described by the formula $f_m=m*f_{rep}+f_0$, m being a natural number, and
    c) varying said offset frequency $f_0$ by varying a geometric phase which imparts a phase circulation delay to said carrier wave of said laser pulse per resonator circulation, the geometric phase being dependent upon an area enclosed by a path travelled on a surface of a Poincaré sphere by a polarization of the laser pulse.

2. Method according to claim 1, wherein varying said geometric phase is performed such that the group circulation time of said laser pulse in said resonator is thereby not substantially changed.

3. Method according to claim 1, wherein varying the geometric phase is achieved by varying the orientation of at least a birefringent and/or a polarizing element within the resonator.

4. Method according to claim 3, wherein steps b) and c) are repeatedly performed consecutively, whereby the orientation of said birefringent and/or said polarizing element is varied based on the offset frequency $f_0$ last measured.

5. Method according to claim 3, wherein prior to said laser pulse impinging said birefringent and/or said polarizing element, the polarization of said laser pulse is turned into an elliptical or circular polarization, so that said laser pulse is elliptically or circularly polarized when impinging said birefringent and/or said polarizing element.

6. Resonator arrangement for generating laser pulses, wherein said resonator arrangement comprises a resonator, an active medium and an outcoupling device for coupling out laser pulses from said resonator, wherein
    said resonator arrangement comprises a measuring device for determining an offset frequency $f_0$ of the frequency comb corresponding to said laser pulses, said frequency comb having a plurality of laser modes $f_m$ at a distance $f_{rep}$ from one another, the frequencies of which can be described by the formula $f_m=m*f_{rep}+f_0$, m being a natural number,
    that at least one birefringent or polarizing element being variable in its orientation is arranged within said resonator in such a way that with a variation in the orientation of said at least one birefringent or polarizing element, a geometric phase which is imparted to a carrier wave of a laser pulse per resonator circulation is variable and the offset frequency $f_0$ of the frequency comb associated with said laser pulse is thereby variable, and
    said offset frequency $f_0$ is varied by varying the geometric phase which imparts a phase circulation delay to said carrier wave of said laser pulse per said resonator circulation, the geometric phase being dependent upon an area enclosed by a path travelled on a surface of a Poincaré sphere by a polarization of the laser pulse.

7. Resonator arrangement with a resonator for receiving laser pulses, wherein
    said resonator arrangement comprises a measuring device for determining an offset frequency $f_0$ of the frequency comb corresponding to said laser pulses, said frequency comb having a plurality of laser modes $f_m$ at a distance $f_{rep}$ from one another, the frequencies of which can be described by the formula $f_m=m*f_{rep}+f_0$, m being a natural number,
    at least one adjustable birefringent or polarizing element is arranged within said resonator, which by varying a geometric phase that is imparted to a carrier wave of said laser pulses, per resonator circulation causes a different delay for the phase and group circulation time,
    when varying the setting of said at least one adjustable birefringent or polarizing element, the circulation losses of the laser pulse in said resonator are not substantially changed, and
    said offset frequency $f_0$ is varied by varying the geometric phase which imparts a phase circulation delay to a carrier wave of said laser pulse per said resonator circulation, the geometric phase being dependent upon an area enclosed by a path travelled on a surface of a Poincaré sphere by a polarization of the laser pulse.

8. Resonator arrangement according to claim 7, wherein the phase and/or group delay can be varied by changing the orientation of the birefringence of said birefringent element or by rotating said at least one birefringent or polarizing element about the optical axis of said resonator.

9. Resonator arrangement according to claim 7, wherein the polarization of said laser pulse, at said at least one birefringent or polarizing element is circular or substantially circular.

10. Resonator arrangement according to claim 7, wherein the variation of the phase circulation time of said carrier wave of said laser pulse does not substantially change the group circulation time of said pulse.

11. Resonator arrangement according to claim 7, wherein said resonator comprises an active medium and an outcoupling device, and in addition comprises an element which is adapted to generate mode-coupled laser pulses in said resonator.

12. Resonator arrangement according to claim 7, wherein said measuring device determines the offset frequency $f_0$ which determines the position of resonator modes in the frequency domain in absolute or relative terms, and in that the position of said modes is variable by said at least one birefringent or polarizing element.

13. Resonator arrangement according to claim 6, wherein said resonator arrangement comprises an actuating device that is configured to vary the difference of the phase and group circulation delay in said resonator.

14. Resonator arrangement according to claim 13, wherein said resonator arrangement comprises a control device which is configured to send a control signal to said actuating device, wherein said control signal is dependent upon the offset frequency determined by said measuring device.

15. Resonator arrangement according to claim 6, wherein said at least one birefringent or polarizing element is a delay element with a phase difference of pi or pi/2.

16. Resonator arrangement according to claim 6, wherein said at least one birefringent or polarizing element can be adjusted by the electro-optic effect or by mechanical pressure, said at least one element comprises a liquid crystal and/or said at least one element is formed in a waveguide with electro-optical material.

17. Resonator arrangement according to claim 15, wherein the variation in orientation of the birefringence is achieved in that a birefringent element is arranged in said resonator such that a static birefringence arises along a first pair of axes and a second adjustable birefringence arises along a second non-identical pair of axes.

18. Resonator arrangement according to claim 17, wherein said static birefringence amounts to a phase shift of Pi/2 or Pi.

19. Resonator arrangement according to claim 6, wherein a plurality of adjustable birefringent elements and/or polarizing elements is arranged consecutively in said resonator.

20. Resonator arrangement according to claim 6, wherein the geometric phase can continuously be further adjusted and/or modulated with a frequency greater than 100 kHz.

21. Resonator arrangement according to claim 6, wherein a first polarization varying element which is configured to turn a linearly polarized laser pulse into a circularly or elliptically polarized laser pulse and a second polarization varying element which is configured to turn a circularly or elliptically polarized laser pulse into a linearly polarized laser pulse are further provided in said resonator, wherein said at least one birefringent or polarizing element is disposed between said first and second polarization varying elements.

22. Resonator arrangement according to claim 21, wherein said second polarization varying element comprises a polarizer.

23. Resonator arrangement according to claim 6, wherein said at least one birefringent or polarizing element is passed twice by said laser pulse with each passage through said resonator in the opposite direction.

24. Resonator arrangement according to claim 6, wherein in addition to the offset frequency, the mode distance $f_{rep}$ is adjustable with its own actuator.

25. Method according to claim 1, wherein varying the geometric phase is achieved by varying the orientation by rotation about an optical axis of said resonator of at least a birefringent and/or a polarizing element within the resonator.

* * * * *